(12) United States Patent
Ouyang et al.

(10) Patent No.: US 12,533,224 B2
(45) Date of Patent: *Jan. 27, 2026

(54) PREPARATION METHOD OF MATERIAL FOR PUNCTURE-RESISTANT ARTIFICIAL BLOOD VESSEL AND ARTIFICIAL BLOOD VESSEL PREPARED THEREBY

(71) Applicant: WUHAN YOUNGSEN BIOTECH CO., LTD., Wuhan (CN)

(72) Inventors: Chenxi Ouyang, Wuhan (CN); Jiarong Li, Wuhan (CN); Chenhong Wang, Wuhan (CN); Sishi Liu, Wuhan (CN); Jianpeng Liu, Wuhan (CN)

(73) Assignee: WUHAN YOUNGSEN BIOTECH CO., LTD., Wuhan (CN)

( * ) Notice: Subject to any disclaimer, the term of this patent is extended or adjusted under 35 U.S.C. 154(b) by 1230 days.

This patent is subject to a terminal disclaimer.

(21) Appl. No.: 17/377,424

(22) Filed: Jul. 16, 2021

(65) Prior Publication Data

US 2021/0338411 A1   Nov. 4, 2021

Related U.S. Application Data

(63) Continuation of application No. PCT/CN2020/072101, filed on Jan. 14, 2020.

(30) Foreign Application Priority Data

Jan. 16, 2019 (CN) .......................... 201910040739.8
Jan. 16, 2019 (CN) .......................... 201910040748.7
Jan. 16, 2019 (CN) .......................... 201910040750.4

(51) Int. Cl.
*A61F 2/06* (2013.01)
*A61F 2/00* (2006.01)
(Continued)

(52) U.S. Cl.
CPC .............. *A61F 2/06* (2013.01); *A61F 2/0077* (2013.01); *A61F 2/062* (2013.01); *B05D 1/002* (2013.01);
(Continued)

(58) Field of Classification Search
None
See application file for complete search history.

(56) References Cited

U.S. PATENT DOCUMENTS 12,257,141 B2 *  3/2025  Ouyang .................... D01F 6/92
2016/0302911 A1 * 10/2016  Soletti ..................... A61F 2/062

FOREIGN PATENT DOCUMENTS

CN        109914036 A  *  6/2019  ............. D04H 1/728
CN        111304831 B     1/2021

* cited by examiner

*Primary Examiner* — Michael P. Rodriguez
(74) *Attorney, Agent, or Firm* — HOWARD M COHN and Associates, LLC (57) ABSTRACT

The present invention provides a preparation method of a material for a puncture-resistant artificial blood vessel. The artificial blood vessel prepared by the method comprises two layers: the dense outer layer and the electrospun inner layer, the structures of these two layers are combined tightly and are inseparable, so that the properties of blood oozing resistance and repeated puncture resistance required by the artificial blood vessel can be provided. The puncture-resistant artificial blood vessel provided by the present invention has excellent biocompatibility, blood compatibility and flexibility and has the functions of blood oozing resistance and repeated puncture resistance. The method provided by the present invention has the characteristics such as convenience in operation, simplicity in production process and liability to the realization of large scale.

7 Claims, 6 Drawing Sheets

(51) Int. Cl.
*B05D 1/00* (2006.01)
*B05D 1/02* (2006.01)
*D01D 5/00* (2006.01)
*D04H 1/728* (2012.01)
B29C 48/151 (2019.01)

(52) U.S. Cl.
CPC ........... *D01D 5/003* (2013.01); *D01D 5/0038* (2013.01); *D01D 5/0061* (2013.01); *D01D 5/0084* (2013.01); *D04H 1/728* (2013.01); A61F 2002/0081 (2013.01); A61F 2210/0076 (2013.01); A61F 2240/001 (2013.01); A61F 2250/0058 (2013.01); A61L 2420/02 (2013.01); B05D 1/02 (2013.01); B05D 2254/02 (2013.01); B05D 2503/00 (2013.01); B05D 2518/00 (2013.01); B29C 48/151 (2019.02); D10B 2331/04 (2013.01); D10B 2331/041 (2013.01); D10B 2331/10 (2013.01); D10B 2509/00 (2013.01)

PREPARATION METHOD OF MATERIAL FOR PUNCTURE-RESISTANT ARTIFICIAL BLOOD VESSEL AND ARTIFICIAL BLOOD VESSEL PREPARED THEREBY

CROSS-REFERENCE TO RELATED APPLICATIONS

The present application is a continuation-application of International Patent Application (PCT) No. PCT/CN2020/072101 filed on Jan. 14, 2020, which claims foreign priority of three Chinese Patent Applications, No. 201910040739.8, No. 201910040748.7 and No. 201910040750.4 filed on Jan. 16, 2019, the entire contents of which are hereby incorporated by reference.

TECHNICAL FIELD

The present invention relates to the technical field of medical materials, in particular to a preparation method of a material for a puncture-resistant artificial blood vessel and an artificial blood vessel prepared thereby.

BACKGROUND ART

After an artificial polytetrafluoroethylene blood vessel which is clinically applied is implanted to a human body, thrombus is easy to form, and a punctured artificial polytetrafluoroethylene blood vessel is relatively large in pore so as to easily result in blood oozing. Therefore, various problems in terms of long-time patency rate, blood oozing resistance and puncture resistance more need to be solved in a development process of a small-diameter blood vessel.

An artificial blood vessel with a multilayer fiber structure is prepared by using an electrospinning technology in the prior art. However, there are relatively large gaps among fibers and among layers to result in stripping among the layers, that is, false aneurysm occurring clinically, after blood oozes from the gaps among the fibers, and therefore, even if the multilayer fiber structure is adopted, a clinical demand for blood oozing resistance cannot be effectively met. Further, some artificial blood vessels for arteriovenous fistulization achieve a certain aim of oozing resistance by reducing the porosity, however, their functions for blood oozing resistance are insufficient, the intensities of the vessels are not high enough as well, and mechanical properties cannot meet a clinical demand for long-acting application after repeated puncture.

An artificial polyurethane blood vessel on the market at present is nonideal in both puncture resistance and blood oozing resistance, and is greatly lowered in mechanical properties and obvious in blood oozing after repeated puncture. Therefore, in order to obtain an artificial blood vessel with excellent properties, it is necessary to reasonably select the material of the blood vessel and optimize and control a structure.

SUMMARY

A main purpose of the present invention is to provide a preparation method of a material for a puncture-resistant artificial blood vessel and an artificial blood vessel prepared thereby to overcome defects existing in an existing artificial blood vessel, thereby ensuring that the artificial blood vessel has excellent blood compatibility, also has blood oozing resistance and puncture resistance, can be effectively used for treating vascular diseases, and is particularly suitable for treating small-diameter blood vessels.

In order to achieve the above-mentioned purpose, the present invention provides a preparation method of a material for a puncture-resistant artificial blood vessel, including the following steps:

S1: dissolving a polymer into a solvent to obtain a polymer solution with a concentration w/v of 10-70%, and stirring the polymer solution at a room temperature for 5-48 h;

S2: placing the polymer solution obtained in S1 over a mandrel device and performing electrospinning to obtain a porous electrospun inner layer, drying the inner layer for 5-48 h to remove the residual solvent; and S3: with the inner layer obtained in S2 as a receiving surface, performing first electric spray, second electric spray, ... $n^{th}$ electric spray with the polymer solution to obtain a dense outer layer, thereby forming the material for the puncture-resistant artificial blood vessel; wherein the first electric spray process includes spraying, stopping, spraying, stopping, ... repeated cycles, a time of the stopping in the first electric spray process is 5-20 min; and a time of each of the first electric spray, the second electric spray and the $n^{th}$ electric spray is 5-50 min.

In a preferred embodiment, in S1, the polymer is selected from one or more of polycaprolactone (PCL), polyurethane (PU) and polylactide (PLA); and the solvent is selected from one or more of N,N-dimethylformamide (DMF), N,N-dimethylacetamide (DMAC), acetone, tetrahydrofuran (THF) and hexafluoroisopropanol (HFIP).

Preferably, a weight-average molecular weight of the PCL, the PLA and the PU is 10000-1000000.

More preferably, the weight-average molecular weight of the PCL is 60000-300000, the weight-average molecular weight of the PLA is 50000-500000, and the weight-average molecular weight of the PU is 100000-600000.

In a preferred embodiment, in S1, the polymer solution contains less than or equal to 20 wt % of the PCL, less than or equal to 20 wt % of the PLA and 60 wt %-100 wt % of the PU.

In a preferred embodiment, in S2, the step of performing electrospinning includes: injecting the polymer solution into an injector, and regulating a distance between a spinning nozzle and a mandrel receiving device to be 5-25 cm; and performing spinning under the conditions that an ambient temperature is 20-70° C., an ambient humidity is 20-60% RH, a voltage is regulated to be 8-40 kV, a feeding speed of the solution is 0.5-5 mL/h, and a rotating speed of a roller is 10-1000 rad/min.

In a preferred embodiment, in S2, a time of the performing electrospinning is 5-20 h.

In a preferred embodiment, in S3, the polymer solution adopted during electric spray is selected from one or two of the PCL and the PU.

In a preferred embodiment, in S3, an $n^{th}$ value for the $n^{th}$ electric spray is greater than or equal to 3.

In a preferred embodiment, in S3, the $n^{th}$ value for the $n^{th}$ spray is 3-8. There is still a great deal of solvent even in a high-concentration spinning solution, and a quantity of the solution attached to surfaces of fibers can be properly controlled by single electric spray within short time. However, a solute contained by single electric spray is not enough to completely cover the surfaces of the fibers to form a dense membrane with a certain thickness, so that the electric spray needs to be repeated intermittently for many times to achieve the aim of complete coverage and meanwhile to ensure that there is enough time for the volatilization of the solvent in the electric spray solution.

In a preferred embodiment, in S3, concentrations of polymers adopted for the first electric spray, the second electric spray and the $n^{th}$ electric spray are sequentially increased. The concentration should be within a range which can be accepted by an electric spray technology, that is, the solution can be sprayed under the traction of an electric field. In addition, firstly, a low-concentration solution with relatively high flowability is electrically sprayed for many times, so that the electrically sprayed solution is in tight and seamless contact with the fibers; after the electrically sprayed solution is dried, a high-concentration solution is electrically sprayed to reduce solvent adhesion, and meanwhile, the dense membrane with a certain thickness is achieved within relatively short time.

Preferably, the concentrations of the polymers adopted in the first electric spray, the second electric spray and the $n^{th}$ electric spray are respectively 15-35% w/v, 18-40% w/v and 20-60% w/v.

In a preferred embodiment, in S3, the first electric spray, the second electric spray and the $n^{th}$ electric spray are performed under the conditions including: the feeding speed is 0.1-5 mL/h, the rotating speed of the roller is 50-1000 rad/min; and more preferably, the ambient temperature is 10-50° C., the ambient humidity is 10-60% RH, and the voltage is 5-30 kV.

Another purpose of the present invention is to provide a puncture-resistant artificial blood vessel prepared by using the above-mentioned preparation method. The puncture-resistant artificial blood vessel includes: an electrospun inner layer and an electrically sprayed dense outer layer.

In a preferred embodiment, a thickness of the inner layer is 1 µm-1000 µm, diameters of the fibers in the inner layer are 50 nm-5000 nm, and a thickness of the dense outer layer is 1 µm-1000 µm;

preferably, the thickness of the fiber inner layer is 5 µm-700 µm, the diameters of the fibers in the inner layer are 50 nm-3000 nm, and the thickness of the dense outer layer is 5 µm-700 µm; and more preferably, the thickness of the fiber inner layer is 50 µm-450 µm, the diameters of the fibers are 800 nm-3000 nm, and the thickness of the dense outer layer is 10 µm-300 µm.

The puncture-resistant artificial blood vessel further provided by the present invention is applicable to an in-vivo vascular graft surgery or a heart bypass surgery.

It should be noted that there has not been a judging standard for the puncture resistance of the product in the present invention internationally. A puncture-resistant artificial blood vessel meeting a requirement cannot be judged by the thickness, hardness and elasticity of a material, and there is no linear association between the puncture resistance and each of these properties.

Found by an applicant through research, in order to obtain an artificial blood vessel with excellent properties, it is necessary to reasonably select the material of a blood vessel and optimize and control a structure. An inner layer structure of an artificial composite blood vessel is prepared by adopting an electrospinning technology to obtain a microstructure promoting the generation of an endangium, thereby achieving the long-time patency rate; and meanwhile, the unique blood vessel structure brought by the electrospinning technology ensures that good mechanical properties may be still maintained after the wall of the blood vessel is punctured for many times. Electric spray means aggregation on the surfaces of the fibers, and therefore, the fibers in an inner layer which is in contact with an electric spray layer are fused to achieve the effect of tight contact with the fibers in the inner layer. By virtue of the characteristics of trace solution spray in an electric spray technology and low solvent content in a high-concentration solution, the solution sprayed on the inner layer is only enough to fuse the fibers on the outermost surface of the inner layer, but cannot further fuse deep-layer fibers on the inner layer. A preliminary micro-permeable layer is formed after an electric spray solution is dried, at the moment, the porosity of the micro-permeable layer has been greatly reduced as comparison with that of the fibers on the inner layer; and then, trace solution spray is repeated to gradually reduce the porosity of the micro-permeable layer until pores are eliminated, and then, a solution spray quantity is increased to complete electric spray of the structure of the dense outer layer, thereby obtaining the artificial composite blood vessel. In addition, by controlling the volatilization rate of the solvent in the polymer solution, the structures of the electrospun inner layer and the dense outer layer which are compounded tightly may also be achieved. For the structures of the dense outer layer and the electrospun inner layer, membranes of two layers are combined tightly and are inseparable, so that the properties of blood oozing resistance and repeated puncture resistance required by the artificial blood vessel can be provided.

The puncture-resistant artificial blood vessel provided by the present invention has excellent biocompatibility, blood compatibility and flexibility and has the functions of blood oozing resistance and repeated puncture resistance. The method provided by the present invention has the characteristics such as convenience in operation, simplicity in production process and liability to the realization of large scale.

DETAILED DESCRIPTION

The present invention will be described below in detail in conjunction with the accompanying drawings and specific embodiments. All materials used in the embodiments are available commercially.

Definitions

Puncture resistance, there is no accurate general definition of this performance in the world at present. This application is tested with reference to the pharmaceutical industry standard YY0500-2004/ISO7198:1998 of China. It is mentioned in the standard that when artificial blood vessels are clinically designed for vascular access, it is necessary to measure the residual strength of blood vessels after repeated puncture. The puncture tool used in the embodiments of the application is: 16 G puncture needle (ISO 9626:2016 Stainless steel needle tubing for the manufacture of medical devices—Requirements and test methods).

Embodiment 1: Preparation Process of Puncture-Resistant Artificial Blood Vessel (1) Preparation of a Solution:

PCL (the weight-average molecular weight is 100000) and PU (the weight-average molecular weight is 120000) are dissolved into HFIP, wherein a weight ratio of the PCL to the PU is equal to 10:90, and the dissolved product is heated and stirred in a 40° C. water bath for 12 h to obtain a polymer solution with the concentration of 10% w/v for standby application of electrospinning.

PU (the weight-average molecular weight is 150000) is dissolved into a mixed solvent of N,N-dimethylformamide (DMF) and acetone (a volume ratio is 5/5) and is heated and stirred in a 40° C. water bath for 12 h to obtain electric spray solutions with concentrations of 15% w/v, 18% w/v and 22% w/v for standby application of electric spray.

(2) Electrospinning: the solution obtained in (1) is injected into a 10 mL injector which is added with a 21 G stainless steel syringe needle. A distance between a spinning nozzle and a roller (mandrel receiving device) is regulated to be 15 cm, and spinning is performed for 8 h under the conditions that the ambient temperature is 40° C., the ambient humidity is 40% RH, the voltage is regulated to be 30 kV, the rotating speed of the roller is 100 rad/min, and the feeding speed of the solution is 1 mL/h to obtain an electrospun inner layer.

(3) A fiber membrane of the electrospun inner layer obtained in (2) is dried for 12 h to remove the excessive residual solvent.

(4) Electric Spray:

a) Set electric spray conditions that the concentration of the polymer solution to be 15% (w/v), the feeding speed to be 3.0 mL/h, the rotating speed of the roller to be 50 rad/min, the ambient temperature to be 50° C., the ambient humidity to be 50% RH and the voltage to be 30 kV, perform the electric spray for 30 min, stop for 20 min. When a trace amount of electric spray solution is attached to surfaces of fibers on an inner layer and is fused with the fibers, the porosity of the fiber layer is reduced.

b) Perform the electric spray for 30 min again, and then stop for 20 min, so that the electric spray solution is secondarily fused with the fibers, and the porosity is further reduced.

c) Regulate the concentration to be 18% (w/v), the feeding speed to be 4 mL/h and the rotating speed of the roller to be 50 rad/min, perform the electric spray for 10 min to eliminate the porosity and form a relatively thin dense electric spray membrane.

d) Regulate the concentration to be 22% (w/v), the feeding speed to be 0.1 mL/h and the rotating speed of the roller to be 80 rad/min, perform the electric spray for 30 min to ensure that the electric spray solution is aggregated on the surface of the relatively thin dense electric spray membrane, and dry to form a dense outer layer with a certain thickness.

Figure 1:
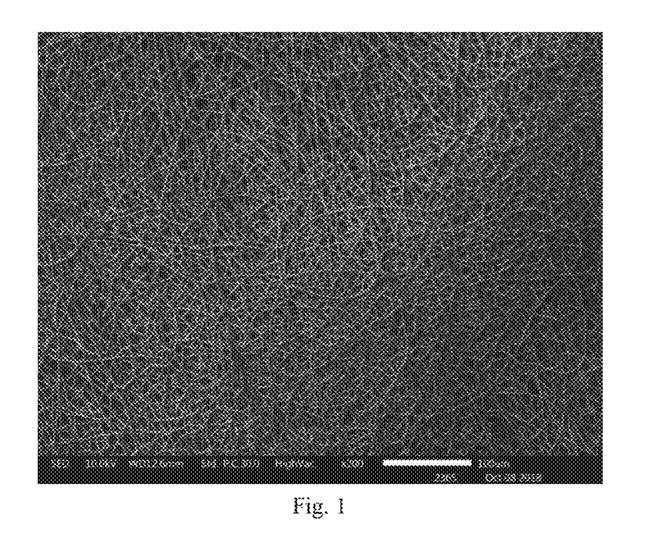
FIG. 1 is a schematic diagram showing an SEM of a fiber morphology of an electrospun inner layer of a puncture-resistant artificial blood vessel obtained in embodiment 1 of the present invention.
Figure 2:
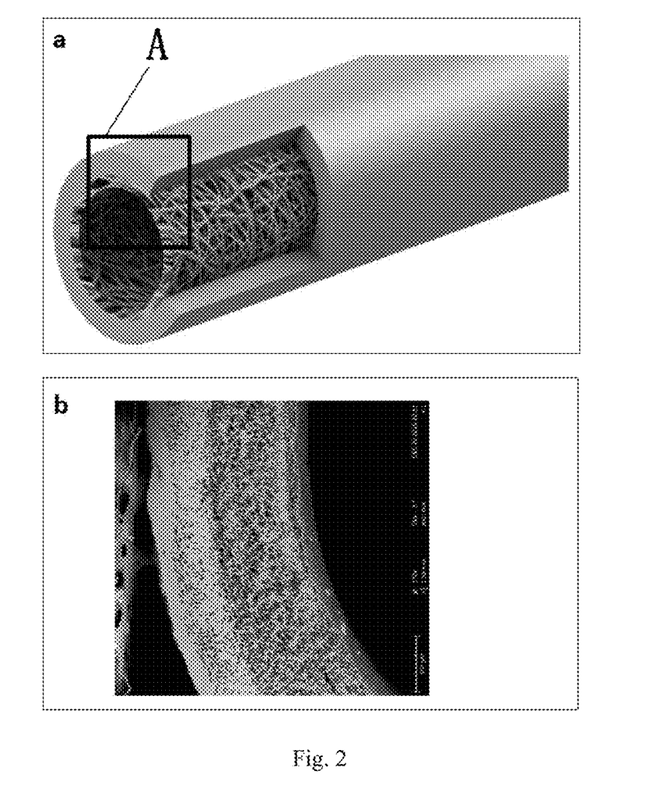
FIG. 2 is a schematic diagram showing an SEM of a puncture-resistant artificial blood vessel obtained in embodiment 1.

FIG. 1 is schematic diagram showing an SEM of a fiber morphology of an electrospun inner layer of an artificial blood vessel achieved in embodiment 1. FIG. 2 is a schematic diagram showing an SEM of a puncture-resistant achieved in embodiment 1 (FIG. 2a is an SEM of the puncture-resistant artificial blood vessel; FIG. 2b is an enlarged view at A in FIG. 2a). By measurement, a thickness of the electrospun inner layer is 450 μm, diameters of the fibers are 800 nm, and a thickness of the dense outer layer is 300 μm.

Embodiment 2: Preparation Process of Puncture-Resistant Artificial Blood Vessel (1) Preparation of a Solution:

PLA (the weight-average molecular weight is 150000) and PU (the weight-average molecular weight is 120000) are dissolved into HFIP, wherein a weight ratio of the PLA to the PU is equal to 5:95, and the dissolved product is heated and stirred in a 40° C. water bath for 12 h to obtain a polymer solution with the concentration of 15% w/v for standby application of electrospinning.

PU (the weight-average molecular weight is 200000) is dissolved into a mixed solvent of N,N-dimethylformamide (DMF) and acetone (a volume ratio is 6/4) and is heated and stirred in a 40° C. water bath for 12 h to obtain electric spray solutions with concentrations of 35% w/v and 40% w/v for standby application of electric spray.

(2) Electrospinning: the solution obtained in (1) is injected into a 10 mL injector which is added with a 21 G stainless steel syringe needle. A distance between a spinning nozzle and a roller (mandrel receiving device) is regulated to be 15 cm, and spinning is performed for 10 h under the conditions that the ambient temperature is 45° C., the ambient humidity is 40% RH, the voltage is regulated to be 25 kV, the rotating speed of the roller is 100 rad/min, and the feeding speed of the solution is 1 mL/h to obtain an electrospun inner layer.

(3) A fiber membrane of the electrospun inner layer obtained in (2) is dried for 12 h to remove the excessive residual solvent.

(4) Electric Spray:

a) Set electric spray conditions that the concentration of the polymer solution to be 35% (w/v), the feeding speed to be 0.2 mL/h, the rotating speed of the roller to be 800 rad/min, the ambient temperature to be 10° C., the ambient humidity to be 20% RH and the voltage to be 5 kV, perform the electric spray for 15 min, stop for 10 min. When a trace amount of electric spray solution is attached to surfaces of fibers on an inner layer and is fused with the fibers, the porosity of the fiber layer is reduced.

b) Perform the electric spray for 15 min again, and then stop for 10 min, so that the electric spray solution is secondarily fused with the fibers, and the porosity is further reduced.

c) Regulate the concentration to be 35% (w/v), the feeding speed to be 0.1 mL/h and the rotating speed of the roller to be 300 rad/min, perform the electric spray for 5 min to eliminate the porosity and form a relatively thin dense electric spray membrane.

d) Regulate the concentration to be 40% (w/v), the feeding speed to be 1.5 mL/h and the rotating speed of the roller to be 600 rad/min, perform the electric spray for 20 min to ensure that the electric spray solution is aggregated on the surface of the relatively thin dense electric spray membrane, and dry to form a dense outer layer with a certain thickness.

By measurement, a thickness of the electrospun inner layer is 50 μm, diameters of the fibers are 3000 nm, and a thickness of the dense outer layer is 10 μm.

Embodiment 3: Preparation Process of Puncture-Resistant Artificial Blood Vessel (1) Preparation of a Solution:

PLA (the weight-average molecular weight is 150000), PCL (the weight-average molecular weight is 120000) and PU (the weight-average molecular weight is 150000) are dissolved into HFIP, wherein a weight ratio of the PLA:PCL:PU=5:5:90, and the dissolved product is heated and stirred in a 40° C. water bath for 10 h to obtain a polymer solution with the concentration of 15% w/v for standby application of electrospinning.

PU (the weight-average molecular weight is 200000) is dissolved into a mixed solvent of N,N-dimethylformamide (DMF) and acetone (a volume ratio is 6/4) and is heated and stirred in a 40° C. water bath for 10 h to obtain electric spray solutions with concentrations of 35% w/v, 40% w/v and 45% w/v for standby application of electric spray.

(2) Electrospinning: the solution obtained in (1) is injected into a 10 mL injector which is added with a 21 G stainless steel syringe needle. A distance between a spinning nozzle and a roller (mandrel receiving device) is regulated to be 15 cm, and spinning is performed for 10 h under the conditions that the ambient temperature is 40° C., the ambient humidity is 40% RH, the voltage is regulated to be 30 kV, the rotating speed of the roller is 150 rad/min, and the feeding speed of the solution is 1 mL/h to obtain an electrospun inner layer.

(3) A fiber membrane of the electrospun inner layer obtained in (2) is dried for 12 h to remove the excessive residual solvent.

(4) Electric Spray:

a) Set electric spray conditions that the concentration of the polymer solution to be 35% (w/v), the feeding speed to be 3.5 mL/h, the rotating speed of the roller to be 1000 rad/min, the ambient temperature to be 20° C., the ambient humidity to be 10% RH and the voltage to be 5 kV, perform the electric spray for 20 min, stop for 5 min. When a trace amount of electric spray solution is attached to surfaces of fibers on an inner layer and is fused with the fibers, the porosity of the fiber layer is reduced.

b) Perform the electric spray for 20 min again, and then stop for 5 min, so that the electric spray solution is secondarily fused with the fibers, and the porosity is further reduced.

c) Regulate the concentration to be 40% (w/v), the feeding speed to be 2.8 mL/h and the rotating speed of the roller to be 80 rad/min, perform the electric spray for 10 min to eliminate the porosity and form a relatively thin dense electric spray membrane.

d) Regulate the concentration to be 50% (w/v), the feeding speed to be 1.2 mL/h and the rotating speed of the roller to be 200 rad/min, perform the electric spray for 30 min to ensure that the electric spray solution is aggregated on the surface of the relatively thin dense electric spray membrane, and dry to form a dense outer layer with a certain thickness.

By measurement, a thickness of the electrospun inner layer is 100 μm, diameters of the fibers are 2000 nm, and a thickness of the dense outer layer is 80 μm.

Embodiment 4: Preparation Process of Puncture-Resistant Artificial Blood Vessel (1) Preparation of a Solution:

PU (the weight-average molecular weight is 150000) is dissolved into a mixed solvent of N,N-dimethylacetamide (DMAC) and acetone (a volume ratio is 5/5) and is heated and stirred in a 40° C. water bath for 12 h to obtain a polymer solution with the concentration of 5% w/v for standby application of electrospinning.

PU (the weight-average molecular weight is 150000) is dissolved into a mixed solvent of N,N-dimethylacetamide (DMAC) and acetone (a volume ratio is 5/5) and is heated and stirred in a 35° C. water bath for 12 h to obtain electric spray solutions with concentrations of 25% w/v, 35% w/v and 50% w/v for standby application of electric spray.

(2) Electrospinning: the solution obtained in (1) is injected into a 10 mL injector which is added with a 21 G stainless steel syringe needle. A distance between a spinning nozzle and a roller (mandrel receiving device) is regulated to be 18 cm, and spinning is performed for 8 h under the conditions that the ambient temperature is 45° C., the ambient humidity is 35% RH, the voltage is regulated to be 25 kV, the rotating speed of the roller is 150 rad/min, and the feeding speed of the solution is 1 mL/h to obtain an electrospun inner layer.

(3) A fiber membrane of the electrospun inner layer obtained in (2) is dried for 12 h to remove the excessive residual solvent.

(4) Electric Spray:

a) Set electric spray conditions that the concentration of the polymer solution to be 25% (w/v), the feeding speed to be 0.2 mL/h, the rotating speed of the roller to be 60 rad/min, the ambient temperature to be 30° C., the ambient humidity to be 10% RH and the voltage to be 30 kV, perform the electric spray for 15 min, stop for 10 min. When a trace amount of electric spray solution is attached to surfaces of fibers on an inner layer and is fused with the fibers, the porosity of the fiber layer is reduced.

b) Perform the electric spray for 15 min again, and then stop for 10 min, so that the electric spray solution is secondarily fused with the fibers, and the porosity is further reduced.

c) Regulate the concentration to be 35% (w/v), the feeding speed to be 1.8 mL/h and the rotating speed of the roller to be 150 rad/min, perform the electric spray for 20 min to eliminate the porosity and form a relatively thin dense electric spray membrane.

d) Regulate the concentration to be 50% (w/v), the feeding speed to be 0.5 mL/h and the rotating speed of the roller to be 700 rad/min, perform the electric spray for 30 min to ensure that the electric spray solution is aggregated on the surface of the relatively thin dense electric spray membrane, and dry to form a dense outer layer with a certain thickness.

By measurement, a thickness of the electrospun inner layer is 200 μm, diameters of the fibers are 1000 nm, and a thickness of the dense outer layer is 100 μm.

Embodiment 5: Preparation Process of Puncture-Resistant Artificial Blood Vessel (1) Preparation of a Solution:

PLA (the weight-average molecular weight is 200000) and PU (the weight-average molecular weight is 150000) are dissolved into a mixed solvent of N,N-dimethylacetamide (DMAC) and acetone (a volume ratio is 5/5), wherein a weight ratio of the PLA to the PU is equal to 5:95, and the dissolved product is heated and stirred in a 40° C. water bath for 12 h to obtain a polymer solution with the concentration of 12% w/v for standby application of electrospinning.

PU (the weight-average molecular weight is 120000) is dissolved into a mixed solvent of N,N-dimethylacetamide (DMAC) and acetone (a volume ratio is 6/4) and is heated and stirred in a 35° C. water bath for 12 h to obtain electric spray solutions with concentrations of 30% w/v, 40% w/v and 60% w/v for standby application of electric spray.

(2) Electrospinning: the solution obtained in (1) is injected into a 10 mL injector which is added with a 21 G stainless steel syringe needle. A distance between a spinning nozzle and a roller (mandrel receiving device) is regulated to be 12 cm, and spinning is performed for 8 h under the conditions that the ambient temperature is 45° C., the ambient humidity is 35% RH, the voltage is regulated to be 30 kV, the rotating speed of the roller is 150 rad/min, and the feeding speed of the solution is 1 mL/h to obtain an electrospun inner layer.

(3) A fiber membrane of the electrospun inner layer obtained in (2) is dried for 12 h to remove the excessive residual solvent.

(4) Electric Spray:

a) Set electric spray conditions that the concentration of the polymer solution to be 30% (w/v), the feeding speed to be 0.5 mL/h, the rotating speed of the roller to be 1000 rad/min, the ambient temperature to be 30° C., the ambient humidity to be 30% RH and the voltage to be 10 kV, perform the electric spray for 5 min, stop for 10 min. When a trace amount of electric spray solution is attached to surfaces of fibers on an inner layer and is fused with the fibers, the porosity of the fiber layer is reduced.

b) Perform the electric spray for 10 min again, and then stop for 10 min, so that the electric spray solution is secondarily fused with the fibers, and the porosity is further reduced.

c) Regulate the concentration to be 40% (w/v), the feeding speed to be 3.8 mL/h and the rotating speed of the roller to be 550 rad/min, perform the electric spray for 5 min to eliminate the porosity and form a relatively thin dense electric spray membrane.

d) Regulate the concentration to be 60% (w/v), the feeding speed to be 4.5 mL/h and the rotating speed of the roller to be 800 rad/min, perform the electric spray for 5 min to ensure that the electric spray solution is aggregated on the surface of the relatively thin dense electric spray membrane, and dry to form a dense outer layer with a certain thickness.

By measurement, a thickness of the electrospun inner layer is 50 μm, diameters of the fibers are 1500 nm, and a thickness of the dense outer layer is 50 μm.

Embodiment 6: Preparation Process of Puncture-Resistant Artificial Blood Vessel (1) Preparation of a Solution:

PLA (the weight-average molecular weight is 500000) and PU (the weight-average molecular weight is 600000) are dissolved into a mixed solvent of N,N-dimethylacetamide (DMAC) and acetone (a volume ratio is 5/5), wherein a weight ratio of the PLA to the PU is equal to 10:85, and the dissolved product is heated and stirred in a 40° C. water bath for 12 h to obtain a polymer solution with the concentration of 30% w/v for standby application of electrospinning.

PU (the weight-average molecular weight is 500000) is dissolved into a mixed solvent of N,N-dimethylacetamide (DMAC) and acetone (a volume ratio is 6/4) and is heated and stirred in a 35° C. water bath for 12 h to obtain electric spray solutions with concentrations of 50% w/v, 20% w/v and 35% w/v for standby application of electric spray.

(2) Electrospinning: the solution obtained in (1) is injected into a 10 mL injector which is added with a 21 G stainless steel syringe needle. A distance between a spinning nozzle and a roller (mandrel receiving device) is regulated to be 5 cm, and spinning is performed for 30 h under the conditions that the ambient temperature is 70° C., the ambient humidity is 60% RH, the voltage is regulated to be 40 kV, the rotating speed of the roller is 1000 rad/min, and the feeding speed of the solution is 5.0 mL/h to obtain an electrospun inner layer.

(3) A fiber membrane of the electrospun inner layer obtained in (2) is dried for 12 h to remove the excessive residual solvent.

(4) Electric Spray:

a) Set electric spray conditions that the concentration of the polymer solution to be 50% (w/v), the feeding speed to be 2.5 mL/h, the rotating speed of the roller to be 800 rad/min, the ambient temperature to be 30° C., the ambient humidity to be 30% RH and the voltage to be 10 kV, perform the electric spray for 40 min, stop for 20 min. When a trace amount of electric spray solution is attached to surfaces of fibers on an inner layer and is fused with the fibers, the porosity of the fiber layer is reduced.

b) Perform the electric spray for 40 min again, and then stop for 15 min, so that the electric spray solution is secondarily fused with the fibers, and the porosity is further reduced.

c) Regulate the concentration to be 20% (w/v), the feeding speed to be 0.5 mL/h and the rotating speed of the roller to be 100 rad/min, perform the electric spray for 25 min to eliminate the porosity and form a relatively thin dense electric spray membrane.

d) Regulate the concentration to be 35% (w/v), the feeding speed to be 5.0 mL/h and the rotating speed of the roller to be 1000 rad/min, perform the electric spray for 20 min to ensure that the electric spray solution is aggregated on the surface of the relatively thin dense electric spray membrane, and dry to form a dense outer layer with a certain thickness.

By measurement, a thickness of the electrospun inner layer is 200 μm, diameters of the fibers are 800 nm, and a thickness of the dense outer layer is 120 μm.

Embodiment 7: Preparation Process of Puncture-Resistant Artificial Blood Vessel (1) Preparation of a Solution:

PLA (the weight-average molecular weight is 50000), PCL (the weight-average molecular weight is 60000) and PU (the weight-average molecular weight is 100000) are dissolved into HFIP, wherein a weight ratio of the PLA:PCL:PU=5:10:85, and the dissolved product is heated and stirred in a 40° C. water bath for 10 h to obtain a polymer solution with the concentration of 12% w/v for standby application of electrospinning.

PU (the weight-average molecular weight is 100000) is dissolved into a mixed solvent of N,N-dimethylformamide (DMF) and acetone (a volume ratio is 6/4) and is heated and stirred in a 40° C. water bath for 10 h to obtain electric spray solutions with concentrations of 35% w/v, 40% w/v and 50% w/v for standby application of electric spray.

(2) Electrospinning: the solution obtained in (1) is injected into a 10 mL injector which is added with a 21 G stainless steel syringe needle. A distance between a spinning nozzle and a roller (mandrel receiving device) is regulated to be 25 cm, and spinning is performed for 8 h under the conditions that the ambient temperature is 20° C., the ambient humidity is 20% RH, the voltage is regulated to be 8 kV, the rotating speed of the roller is 10 rad/min, and the feeding speed of the solution is 0.5 mL/h to obtain an electrospun inner layer.

(3) A fiber membrane of the electrospun inner layer obtained in (2) is dried for 12 h to remove the excessive residual solvent.

(4) Electric Spray:

a) Set electric spray conditions that the concentration of the polymer solution to be 35% (w/v), the feeding speed to be 5.0 mL/h, the rotating speed of the roller to be 1000 rad/min, the ambient temperature to be 20° C., the ambient humidity to be 10% RH and the voltage to be 5 kV, perform the electric spray for 20 min, stop for 5 min. When a trace amount of electric spray solution is attached to surfaces of fibers on an inner layer and is fused with the fibers, the porosity of the fiber layer is reduced.

b) Perform the electric spray for 20 min again, and then stop for 5 min, so that the electric spray solution is secondarily fused with the fibers, and the porosity is further reduced.

c) Regulate the concentration to be 40% (w/v), the feeding speed to be 2.8 mL/h and the rotating speed of the roller to be 80 rad/min, perform the electric spray for 10 min to eliminate the porosity and form a relatively thin dense electric spray membrane.

d) Regulate the concentration to be 50% (w/v), the feeding speed to be 1.2 mL/h and the rotating speed of the roller to be 200 rad/min, perform the electric spray for 30 min to ensure that the electric spray solution is aggregated on the surface of the relatively thin dense electric spray membrane, and dry to form a dense outer layer with a certain thickness.

By measurement, a thickness of the electrospun inner layer is 100 μm, diameters of the fibers are 1800 nm, and a thickness of the dense outer layer is 10 μm.

Testing of Intensity and Water Leakage Performance After Repeated Puncture

Figure 3:
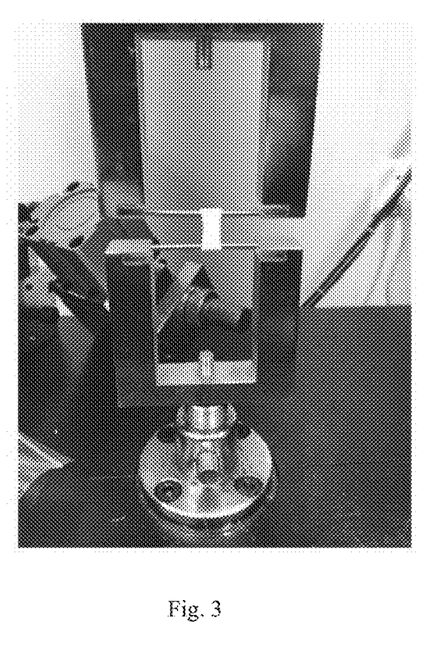
FIG. 3 is a photo showing an instrument for intensity testing.
Figure 4:
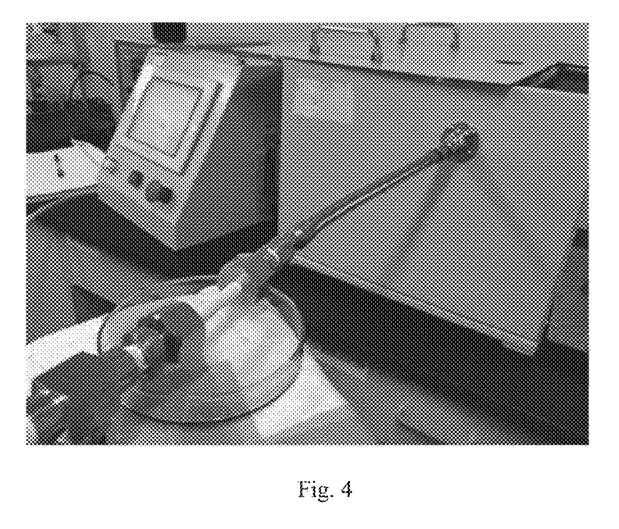
FIG. 4 is a photo showing an instrument for water leakage performance testing.

The intensities and water leakage performance of the puncture-resistant artificial blood vessel prepared in embodiment 1, a Nicast AVflo artificial blood vessel and a single-layer electrospun artificial blood vessel which are repeatedly punctured at the same time are measured. The intensities (an instrument is shown in FIG. 3) and the water leakage performance (an instrument is shown in FIG. 4) after repeated puncture are both tested and subjected to result characterization according to the pharmaceutical industrial standard YY-0500-2004 of the People's Republic of China.

Figure 5:
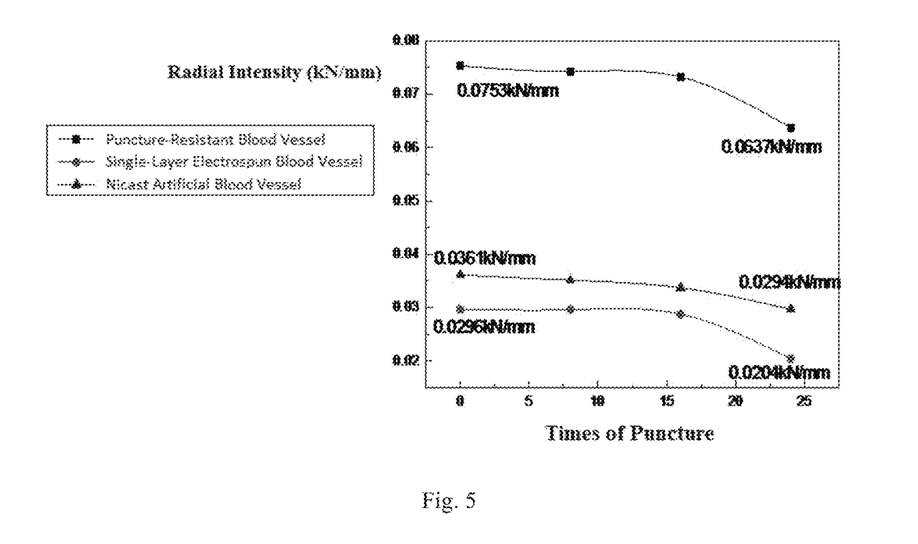
FIG. 5 is a schematic diagram showing comparison for intensity experiment results after repeated puncture of three artificial blood vessels.
Figure 6:
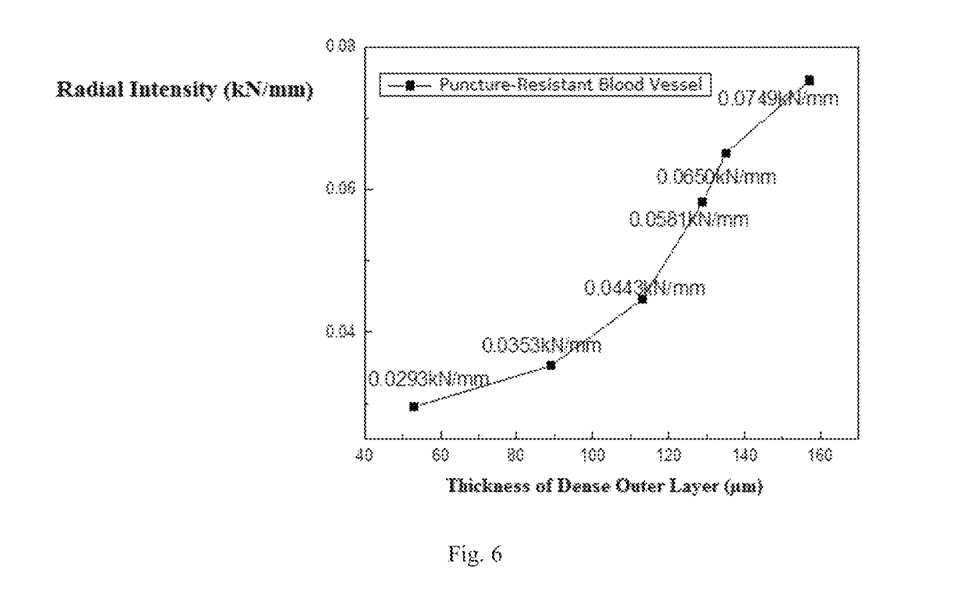
FIG. 6 is a schematic diagram showing that the repeated puncture property of an puncture-resistant artificial blood vessel in embodiment 1 is changed with the thickness of a dense layer serving as an outer layer.

A process of testing the intensities after repeated puncture is described as follows: a short segment of 1.6 cm test sample is cut from an artificial blood vessel sample and is accurate to be ±0.5 mm with millimeter as a unit. Every square centimeter on the outer surface of the sample is punctured for 0, 8, 16 and 24 times, and the puncture process should be limited within ⅓ of the circumference of the blood vessel. After the sample is repeatedly punctured, the intensity on the circumference is tested. For every kind of blood vessels, 3 groups of blood vessels are taken, there are 4 samples in each group, and experimental data is recorded and stored as an average value. The intensity experimental result shows that the average initial radial intensity of the puncture-resistant artificial blood vessel (0.0753 kN/mm) in the embodiment 1 is higher than that of the Nicast artificial blood vessel (0.0361 kN/mm) and the single-layer electrospun artificial blood vessel (0.02968 kN/mm). After repeated puncture, the average radial intensity of the puncture-resistant artificial composite blood vessel (0.0637 kN/mm) is far higher than that of the Nicast artificial blood vessel (0.0294 kN/mm) and the single-layer electrospun artificial blood vessel (0.0204 kN/mm) (see FIG. 5). Moreover, the properties of the repeatedly punctured puncture-resistant artificial composite blood vessel are improved with increase of the thickness of a dense outer layer (see FIG. 6).

Figure 7:
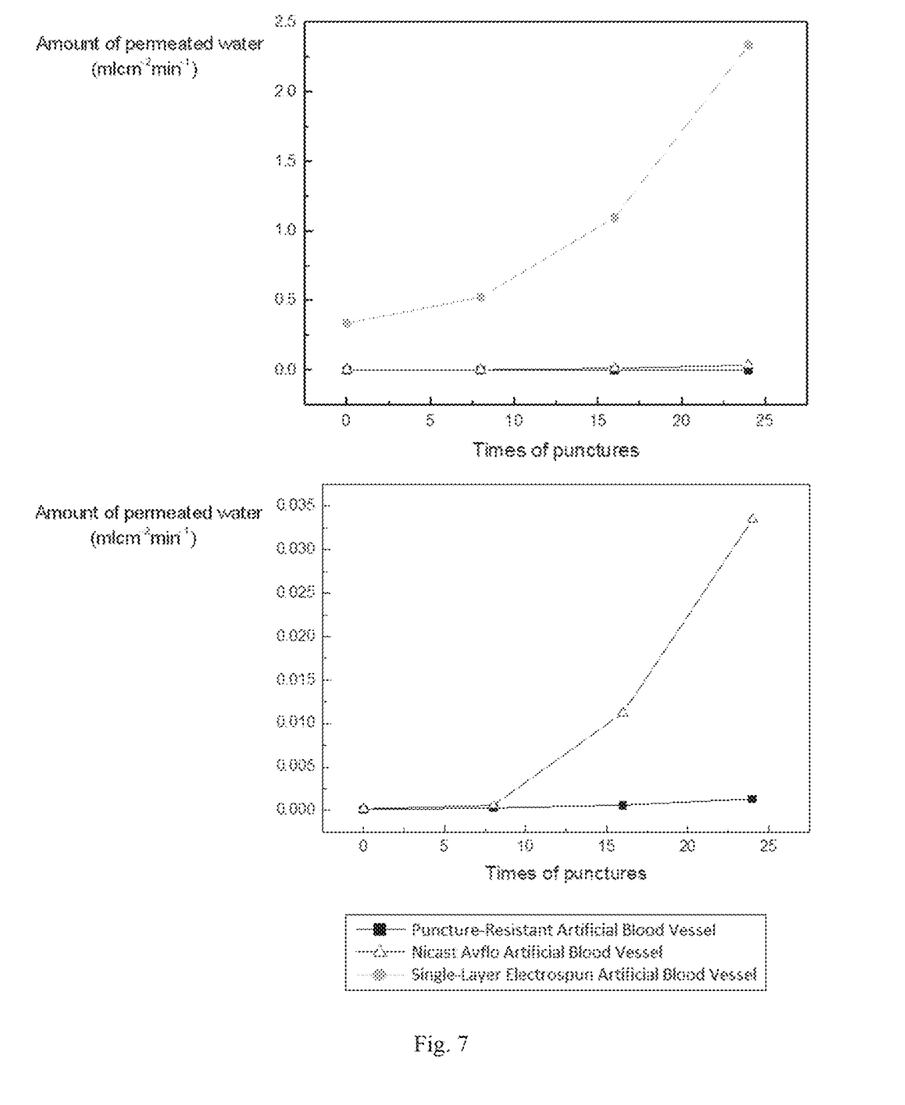
FIG. 7 is a schematic diagram showing experimental result comparison for water permeable capacity tests of the three artificial blood vessels.

A process of testing the water leakage performance is described as follows: at a room temperature, an artificial blood vessel sample with the effective length of 14 cm is taken and is accurate to be ±0.5 mm with millimeter as a unit. A 16 G puncture needle is selected for puncture with the spacing of 0.5 cm, and after the puncture is performed for respectively 0, 8, 16 and 24 times, the water leakage performance in a unit area of the sample within a unit time is measured under the hydrostatic pressure equivalent to 16 kPa. For every kind of blood vessels, 3 groups of blood vessels are taken, there are 4 samples in each group, and experimental data is recorded and stored as an average value. The experimental result shows that the water leakage performance of the punctured artificial blood vessels in all groups increased. However, under the condition that the puncture times are the same, the water leakage performance of the puncture-resistant artificial blood vessel in the embodiment 1 is lower than that of the Nicast artificial blood vessel and is far lower than that of the single-layer electrospun artificial blood vessel (see FIG. 7). The experimental result proves that the puncture resistance and the blood oozing resistance of the puncture-resistant artificial blood vessel provided by the present invention are good.

Comparative Example 1

Comparison for Puncture Resistance of Puncture-Resistant Blood Vessel and Three-Layer Blood Vessel Sample 1: a puncture-resistant artificial blood vessel (double-layer structure) of which the preparation method is the same as that in embodiment 1; and Sample 2: an artificial blood vessel with a three-layer structure of which the preparation method is described as follows:

(1) Preparation of a solution: PCL (the weight-average molecular weight is 100000) and PU (the weight-average molecular weight is 120000) are dissolved into HFIP, wherein a weight ratio of the PCL to the PU is equal to 10:90, and the PCL and the PU are heated and stirred in a 40° C. water bath for 12 h to obtain a polymer solution with the concentration of 8% w/v for standby application of electrospinning; and the PU (the weight-average molecular weight is 150000) is dissolved into a mixed solvent of N,N-dimethylformamide (DMF) and acetone (a volume ratio is 5/5) and is heated and stirred in a 40° C. water bath for 12 h to obtain electric spray solutions with concentrations of 18% w/v, 24% w/v and 40% w/v for standby application of electric spray.

(2) Electrospinning: the solution obtained in (1) is injected into a 10 mL injector which is added with a 21 G stainless steel syringe needle. A distance between a spinning nozzle and a roller (mandrel receiving device) is regulated to be 12 cm, and spinning is performed for 18 h under the conditions that the ambient temperature is 40° C., the ambient humidity is 40% RH, the voltage is regulated to be 30 kV, the rotating speed of the roller is 100 rad/min, and the feeding speed of the solution is 1 mL/h to obtain an electrospun inner layer.

(3) A fiber membrane of the electrospun inner layer obtained in (2) is dried for 12 h to remove the excessive residual solvent.

(4) Electric Spray:

a) Set electric spray conditions that the concentration of the polymer solution to be 18% (w/v), the feeding speed to be 3.0 mL/h, the rotating speed of the roller to be 50 rad/min, the ambient temperature to be 50° C., the ambient humidity to be 50% RH and the voltage to be 30 kV, perform the electric spray for 30 min, stop for 20 min. When a trace amount of electric spray solution is attached to surfaces of fibers on an inner layer and is fused with the fibers, the porosity of the fiber layer is reduced.

b) Perform the electric spray for 30 min again, and then stop for 20 min, so that the electric spray solution is secondarily fused with the fibers, and the porosity is further reduced.

c) Regulate the concentration to be 24% (w/v), the feeding speed to be 4 mL/h and the rotating speed of the roller to be 50 rad/min, perform the electric spray for 10 min to eliminate the porosity and form a relatively thin dense electric spray membrane.

d) Regulate the concentration to be 40% (w/v), the feeding speed to be 0.1 mL/h and the rotating speed of the roller to be 80 rad/min, perform the electric spray for 30 min to ensure that the electric spray solution is aggregated on the surface of the relatively thin dense electric spray membrane, and dry to form a dense middle layer with a certain thickness.

(5) A dense middle layer obtained in (4) is used as a receiving surface, perform the electrospinning like step (2) for 5 h and then dry for more than 12 h to obtain an electrospun outer layer, and finally, the artificial blood vessel with a three-layer composite structure is obtained, named Three-Layer Blood Vessel. By measurement, a thickness of the electrospun inner layer is 450 μm, a thickness of an electrospun outer layer is 300 μm, diameters of fibers are 800 nm, and a thickness of the dense middle layer is 300 μm.

Equipment: A 16 G puncture needle is selected for puncture.

Figure 11:
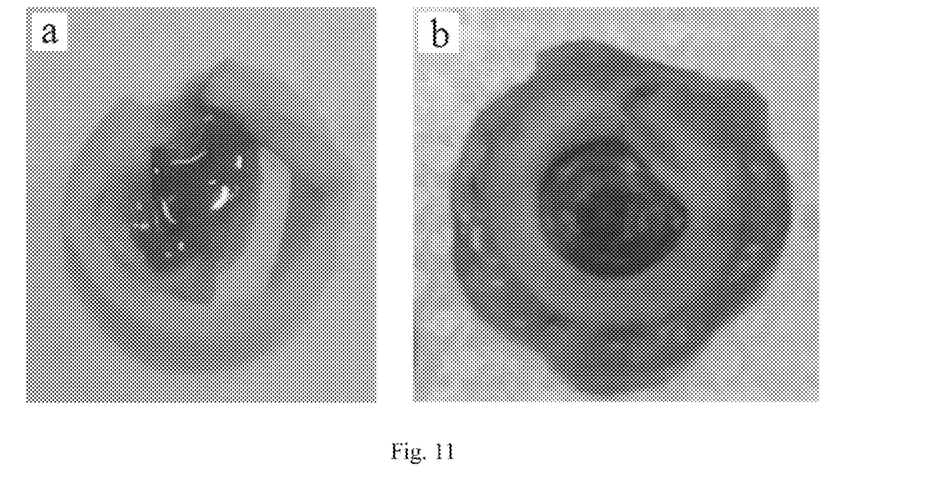
FIG. 11 is a diagram showing comparison for tissue adhesion states of a puncture-resistant artificial blood vessel and a three-layer blood vessel.

Differences of the two samples are shown as follows:

| Contrast | Puncture-Resistant Blood Vessel | Three-Layer Blood Vessel |
| --- | --- | --- |
| Characteristics of Outer Layers | The outer layer is of an electrically sprayed structure and is dense and relatively low in priority which is about 60-70%. | The outer layer is of an electrospun structure and a cytoskeleton-like structure and is relatively high in priority which is about 80-90%. |
| Differences of Production Processes | The outer layer is long in electric spray time and is required to be dried directly after reaching a certain thickness. | The middle layer is short in electric spray time and relatively small in thickness, and the outer layer is spun when the middle layer is not completely dried so that the middle layer is tightly combined with the outer layer. |
| Differences of Applications | The artificial blood vessel is used for an in-vivo vascular graft surgery or a heart bypass surgery. | The artificial blood vessel is used for an in-vivo vascular graft surgery, arteriovenous fistulization or a heart bypass surgery. |
| Mechanical Properties | The mechanical properties are higher. | The mechanical properties are lower. |
| Tissue adhesion states | The surface of blood vessel is smooth, the tissue adheres less and is easy to peel the tissue off; The external surface of blood vessel is dense, which can effectively prevent bacteria from invading the blood vessel wall and causing infection (FIG. 11a). | There is a fibrous outer layer on the surface of blood vessels, which promotes the growth of tissue; It can shorten the time of maturation after implantation and prevent the relative slippage of blood vessel and tissue after implantation (FIG. 11b). |

A short segment of 1.6 cm test sample is cut from each of the sample 1 and the sample 2 and is accurate to be ±0.5 mm with millimeter as a unit. Every square centimeter on the outer surface of each sample is punctured for 0-15 times, and the puncture process should be limited within ⅓ of the circumference of the blood vessel. After the samples are repeatedly punctured, the intensities on the circumferences are tested. For every kind of blood vessels, 15 groups of blood vessels are taken, there are 3 samples in each group, and experimental data are recorded and stored as an average value.

Figure 8:
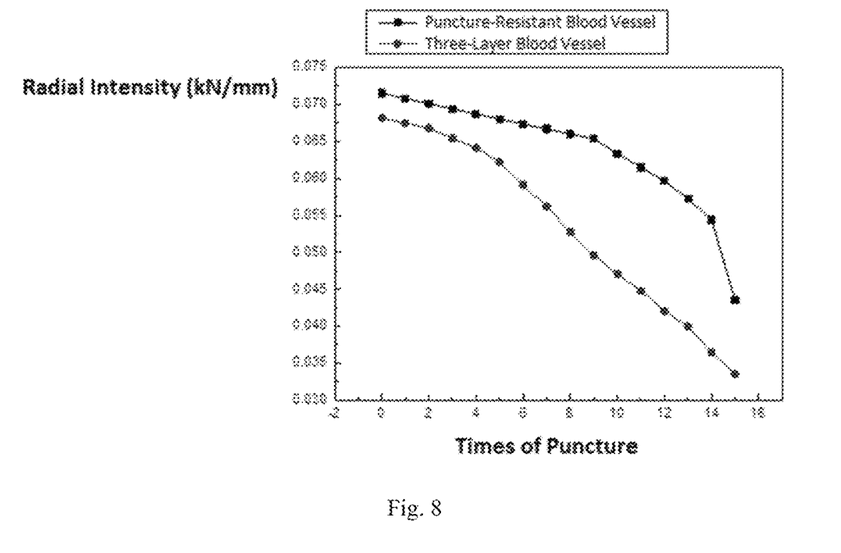
FIG. 8 is a diagram showing comparison for puncture times and mechanical properties of a puncture-resistant artificial blood vessel and an artificial blood vessel with a three-layer structure.

The experimental result shows that the average initial radial intensity of the puncture-resistant blood vessel (0.07142 kN/mm) is higher than that of the three-layer blood vessel (0.06814 kN/mm). After the puncture is repeated for 15 times, the average radial intensity of the puncture-resistant blood vessel (0.04351 kN/mm) is higher than that of the three-layer blood vessel (0.03352 kN/mm), as shown in FIG. 8, although the three-layer blood vessel is thicker than the puncture-resistant blood vessel, the thickness of the dense layer in the puncture-resistant blood vessel is increased so that the radial intensity after repeated puncture is higher than that of the three-layer blood vessel.

Comparative Example 2

Figure 9:
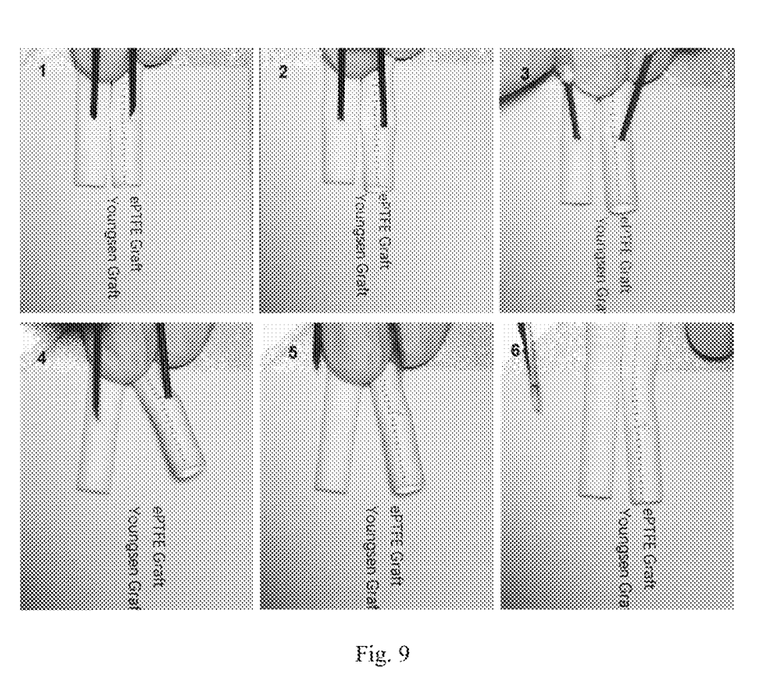
FIG. 9 is a diagram showing comparison for states of the puncture-resistant artificial blood vessel provided and a product INTERING in a puncture experiment.

Comparison for puncture resistance of the artificial blood vessel: a product marked as youngsen is the present application; and a commercially available product INTERING produced by the Gore company is adopted in the comparative example. As shown in FIG. 9, after puncture, needle puncture holes in the product marked as youngsen may be rapidly restored, but needle puncture holes in the product INTERING exist for a long time and cannot be restored.

Comparative Example 3

Figure 10:
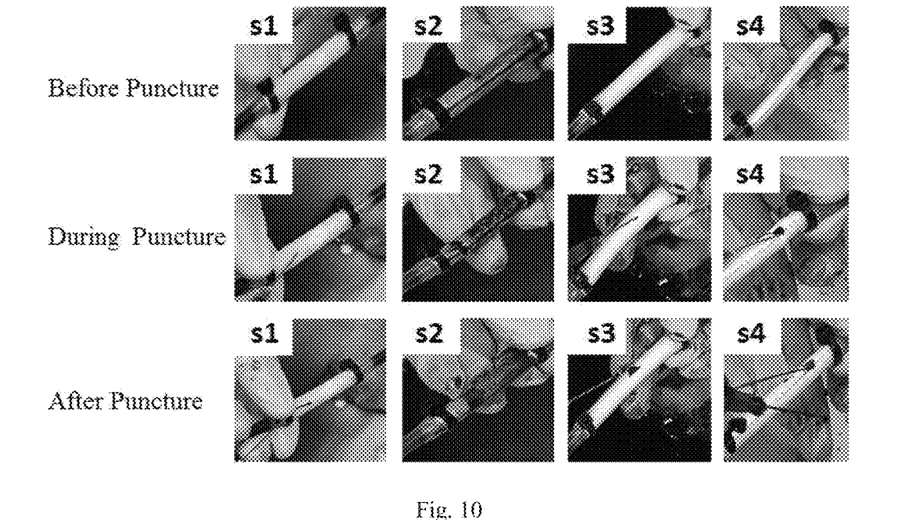
FIG. 10 is a diagram showing comparison for anti-oozing states of four artificial blood vessels.

Sample 1 (s1): a puncture-resistant artificial blood vessel is the same as that in embodiment 1.
Sample 2 (s2): a single-layer electrospun artificial blood vessel
Sample 3 (s3): Acuseal (Product from Gore Company)
Sample 4 (s4): INTERING (Product from Gore Company)
Equipment: A 16 G puncture needle is selected for puncture.
Experimental process: Under the static blood pressure of 16 kPa, observing the oozing state of the artificial blood vessel before, during and after puncture.
Results as shown in FIG. 10, the single-layer blood vessel (s2) had oozed before puncture; its anti-oozing function is poor. For the puncture-resistant artificial blood vessel (s1), there was no oozing during and after puncture, it can quickly retract the closed pinhole, but the retraction of the commercially available products (s3&s4) is poor, they all oozed blood in the experiment. Result shows that the product of the invention has stronger anti-oozing ability.

The preferred embodiment of the present invention has been described in detail above, but the present invention is not limited to this. Within the scope of the technical concept of the invention, a variety of simple variants of the technical scheme of the invention can be carried out, including the combination of various technical features in any other suitable way. These simple variants and combinations should also be regarded as the contents disclosed by the invention, and all belong to the protection scope of the invention.

What is claimed is:

1. A preparation method of a material for a puncture-resistant artificial blood vessel, including the following steps:
    S1: dissolving a polymer into a solvent to obtain a polymer solution with a concentration w/v of 10-70%, and stirring the polymer solution at a room temperature for 5-48 h;
    S2: placing the polymer solution obtained in S1 over a mandrel device and performing electrospinning to obtain a porous electrospun inner layer, drying the inner layer for 5-48 h to remove the residual solvent; and
    S3: with the inner layer obtained in S2 as a receiving surface, performing first electric spray, second electric spray, nth electric spray with the polymer solution to obtain a dense outer layer, thereby forming the material for the puncture-resistant artificial blood vessel; wherein a process of the first electric spray includes spraying, stopping, spraying, stopping, repeated cycles, a time of the stopping in the process of the first electric spray is 5-20 min; and
    a time of each of the first electric spray, the second electric spray and the nth electric spray is 5-50 min.

2. The preparation method according to claim 1, in S1, wherein the polymer is selected from one or more of polycaprolactone, polyurethane and polylactide; and the solvent is selected from one or more of N,N-dimethylformamide, N,N-dimethylacetamide, acetone, tetrahydrofuran and hexafluoroisopropanol; and a weight-average molecular weight of the polycaprolactone, the polylactide and the polyurethane is 10000-1000000.

3. The preparation method according to claim 1, in S1, wherein the polymer solution contains less than or equal to 20 wt % of the polycaprolactone, less than or equal to 20 wt % of the polylactide and 60 wt %-100 wt % of the polyurethane.

4. The preparation method according to claim 1, in S2, wherein the step of performing electrospinning includes: injecting the polymer solution into an injector, and regulating a distance between a spinning nozzle and a mandrel receiving device to be 5-25 cm; and performing spinning under the conditions that an ambient temperature is 20-70° C., an ambient humidity is 20-60% RH, a voltage is regulated to be 8-40 kV, a feeding speed of the solution is 0.5-5 mL/h, and a rotating speed of a roller is 10-1000 rad/min.

5. The preparation method according to claim 1, in S3, wherein the polymer solution adopted during electric spray is selected from one or two of the polycaprolactone and the polyurethane.

6. The preparation method according to claim 1, in S3, wherein an n value for the nth electric spray is greater than or equal to 3.

7. The preparation method according to claim 1, in S3, wherein the first electric spray, the second electric spray and the nth electric spray are performed under the conditions including: a feeding speed is 0.1-5 mL/h, a rotating speed of the roller is 50-1000 rad/min, an ambient temperature is 10-50° C., an ambient humidity is 10-60% RH, and a voltage is 5-30 kV.

* * * * *